US010824274B2

(12) United States Patent
Dyvik et al.

(10) Patent No.: US 10,824,274 B2
(45) Date of Patent: Nov. 3, 2020

(54) INTERACTIVE DISPLAYS

(71) Applicant: Remarkable AS, Oslo (NO)

(72) Inventors: Sondre Hoff Dyvik, Oslo (NO); Martin Tobias Holmedahl Sandsmark, Oslo (NO); Magnus Haug Wanberg, Oslo (NO)

(73) Assignee: Remarkable AS, Oslo (NO)

( * ) Notice: Subject to any disclaimer, the term of this patent is extended or adjusted under 35 U.S.C. 154(b) by 0 days.

(21) Appl. No.: 16/345,424

(22) PCT Filed: Oct. 20, 2017

(86) PCT No.: PCT/EP2017/076920
§ 371 (c)(1),
(2) Date: Apr. 26, 2019

(87) PCT Pub. No.: WO2018/077761
PCT Pub. Date: May 3, 2018

(65) Prior Publication Data
US 2019/0310738 A1 Oct. 10, 2019

(30) Foreign Application Priority Data

Oct. 28, 2016 (GB) .................................. 1618288.3

(51) Int. Cl.
*G06F 3/041* (2006.01)
*G06F 3/044* (2006.01)
(Continued)

(52) U.S. Cl.
CPC ........ *G06F 3/0418* (2013.01); *G06F 3/03547* (2013.01); *G06F 3/0447* (2019.05);
(Continued)

(58) Field of Classification Search
CPC ...... G06F 3/044; G06F 3/0418; G06F 3/0447; G06F 3/03547; G06F 3/04883; G09G 5/08; G09G 2354/00; G09G 2320/0252
See application file for complete search history.

(56) References Cited

U.S. PATENT DOCUMENTS 9,189,147 B2    11/2015  Asmi et al.
2011/0310118 A1* 12/2011  Asmi .................. G06F 3/04883
                                                345/619
(Continued)

FOREIGN PATENT DOCUMENTS

WO        2014/093937      6/2014

OTHER PUBLICATIONS

Hinckley et al., "Motion and Context Sensing Techniques for Pen Computing", GI '13 Proceedings of Graphics Interface, pp. 71-78, (2013).

*Primary Examiner* — Premal R Patel
(74) *Attorney, Agent, or Firm* — Diederiks & Whitelaw, PLC.

(57) ABSTRACT

A method of controlling an interactive display comprises receiving position data over time, where the position data represents the position of an input object relative to the interactive display. A velocity and acceleration of the input object are estimated, and a future position of the input object is predicted based on the estimated velocity and acceleration. This predicted future position is used to update the display.

21 Claims, 2 Drawing Sheets

(51) Int. Cl.
*G06F 3/0354* (2013.01)
*G06F 3/0488* (2013.01)
*G09G 5/08* (2006.01)

(52) U.S. Cl.
CPC ........... *G06F 3/04883* (2013.01); *G09G 5/08* (2013.01); *G09G 2320/0252* (2013.01); *G09G 2354/00* (2013.01)

(56) References Cited

U.S. PATENT DOCUMENTS

| | | | |
|---|---|---|---|
| 2013/0181908 A1* | 7/2013 | Santiago | G06F 3/0416 345/173 |
| 2014/0078085 A1* | 3/2014 | Yeh | G06F 3/0412 345/173 |
| 2014/0204036 A1* | 7/2014 | Schillings | G06F 3/04883 345/173 |
| 2015/0062021 A1* | 3/2015 | Skaljak | G06F 3/04883 345/173 |
| 2015/0355778 A1 | 12/2015 | Kim et al. | |
| 2016/0092021 A1 | 3/2016 | Tu et al. | |
| 2016/0360336 A1* | 12/2016 | Gross | H04W 4/025 |
| 2019/0027162 A1* | 1/2019 | Fukayama | G10L 25/51 |

* cited by examiner

INTERACTIVE DISPLAYS

CROSS-REFERENCE TO RELATED APPLICATIONS

This application represents the U.S. National Phase of International Application No. PCT/EP2017/076920 entitled "Interactive Displays" filed 20 Oct. 2017, which claims priority from Great Britain Patent Application No. 1618288.3 filed on 28 Oct. 2016. The entire contents of these applications are incorporated herein by reference.

BACKGROUND OF THE INVENTION

This invention relates to methods for operating a interactive display and to apparatus comprising interactive displays.

Mobile telephones, tablet computers, PCs, car entertainment systems, white goods and many other devices are commonly equipped with interactive displays. These combine a display screen, such as an LCD, oLED, plasma or electrophoretic display, with an input system, such as a touch- or pen-input system. The input system recognises the presence of an input object such as a user's finger or a stylus touching or in close proximity to the display screen. The device can respond to such inputs by carrying out one or more functions, which may include changing what is shown on the display screen.

Some devices seek to update the display in real-time, based on a continuous input from a user, such as when writing or drawing with a finger or stylus, or when dragging an on-screen object around the screen.

The user experience of such real-time, continuous inputs is often unsatisfactory because of a noticeable time lag (e.g., greater than 50 milliseconds) between the input object being moved and the screen contents updating in response to the movement. This lag can make certain activities, such as handwriting, uncomfortable or difficult to perform accurately. The lag is particularly problematic for devices that use display technologies having slow refresh rates, such as electrophoretic displays (e-paper).

It is known to try to reduce this lag by predicting a future position of the input object based on its previous positions, and updating the display pre-emptively based on this prediction.

U.S. Pat. No. 9,189,147 B2 by Microsoft describes drawing an extension to an ink stroke using a prediction based on a likely direction of a stylus using heuristic techniques to determine a likely result of the input (e.g., a character or other object).

US 2015/062021 A1 by Nvidia describes using the X-Y positions, sizes and pressures of touch events to determine a predictive line based on calculations of average speed, predicted direction, and line curvature.

SUMMARY OF THE INVENTION

The present inventor has realised that such approaches can be improved upon.

From a first aspect, the invention provides a method of controlling an interactive display, the method comprising:
  receiving position data representing a series of positions, over time, of an input object relative to the interactive display;
  estimating a velocity and an acceleration of the input object;
  predicting a future position of the input object based on the estimated velocity and estimated acceleration of the input object; and
  updating the display based on the predicted future position.

From a further aspect, the invention provides apparatus comprising:
  an interactive display;
  a position sensor for generating position data representing a series of positions, over time, of an input object relative to the interactive display; and
  a processing system configured to:
    determine velocity data, representative of a velocity of the input object, and acceleration data, representative of an acceleration of the input object;
    predict a future position of the input object based on the data representative of the velocity of the input object and the data representative of the acceleration of the input object; and
    update the display based on the predicted future position.

Thus it will be seen by those skilled in the art that, in accordance with the invention, the acceleration of the input object is estimated and is used, in addition to other information such as the position and velocity of the input object, to determine how the display should be updated.

The inventor has recognised that certain inputs, such as handwriting, can involve significant variations in the speed of the input object, even within one stroke, and that, by using acceleration, a more accurate prediction can be obtained. This, in turn, leads to a subjectively better user experience.

The velocity is preferably estimated from the position data. It will be appreciated that a speed and a direction may be determined separately from each other. It will also be appreciated that the acceleration may be a scalar or a vector quantity, and may be the full acceleration of the input object or a component of acceleration in a particular direction, such as in the direction of motion of the input object. Data representative of a velocity of the input object may be a binary value equal to an estimate of the velocity, or it may be any other suitable representation of such a value—likewise for the data representative of an acceleration of the input object. The data may be stored in a memory of the apparatus—e.g., in RAM.

The velocity and acceleration estimates may each be a single value; alternatively, a plurality of velocity and/or acceleration values may be determined.

In one set of embodiments, the acceleration of the input object is estimated from the position data. This may be calculated based on some or all of the series of positions (e.g., the most recent positions up to a fixed count, or those positions that relate to times within a fixed time window into the past). Components of the acceleration may be calculated in two orthogonal axes—e.g., an x-axis and a y-axis; these axes may correspond to the axes of a rectangular display screen. This may be done by calculating a second derivative of position in each axis from the position data.

The position data may be smoothed and/or de-noised before it is used to estimate the velocity and/or the acceleration of the input object. Such smoothing and/or de-noising may be done using any appropriate technique—for example, by applying a recursive Bayesian filter or smoothing, such as a Kalman filter, to the position data.

In another set of embodiments, the acceleration of the input object is estimated from acceleration data acquired using a motion sensor. In this case, it may be possible to determine the estimated acceleration very accurately, with the value essentially being measured directly by a sensor, rather than being inferred from position data. The motion sensor is preferably separate from the position sensor. The input object may comprise the motion sensor. For example, an accelerometer may be built into a stylus or pen, or may be worn or carried by a human user. The input object may comprise an output, such as wireless communication unit, for sending information related to the acceleration of the input object to the apparatus.

The future position may be predicted using an appropriate regression technique. It may be predicted using any one or more of: double-exponential smoothing, Gaussian process regression, a neural network, multilayer perceptrons, random forest, and support-vector regression. The processing system may be configured to predict the future position of the input object by inputting the velocity data and the acceleration data to each of a plurality of algorithms (e.g., algorithms implementing respective techniques from the aforementioned list, or other techniques), and by processing the outputs the plurality of algorithms to estimate the future position. The algorithms may implement different respective modelling techniques.

A first algorithm of the plurality of algorithms may process velocity data and/or acceleration data spanning a first time interval, and a second algorithm of the plurality of algorithms may process velocity data and/or acceleration data spanning a second time interval that is longer than the first time interval. Using at least one relatively short-term model and at least one relatively long-term model has been found to provide reliable motion tracking of the input object both when it is moving in long strokes (e.g., when a user is drawing artwork) and when it is moving in short strokes (e.g., during hand-writing).

Each algorithm may output a respective position estimate. The processing system may analyse the plurality of positions estimates using a spatial averaging process, or any other suitable process, to estimate a future position.

A preferred set of embodiments uses Gaussian process regression, which can additionally output a confidence measure. This confidence measure may advantageously be used to update the display and/or in a validation process, as described below. The prediction technique may depend on training data, acquired through an analysis of historic input data.

The prediction of the future position may depend on further data from one or more further sensors, such as a pressure or force sensor in the input object or the interactive display (which may measure a component of a force between the input object and the interactive display) and/or a tilt sensor (which may determine an angle between the input object and the interactive display). This has been found to enable better quality predictions.

The idea of predicting the future position of the input object using a sensor that separate to the position sensor of the interactive display is novel in its own right. Thus, from a further aspect, the invention provides a method of controlling an interactive display, the method comprising:
    receiving position data representing a series of positions, over time, of an input object relative to the interactive display;
    receiving further data from one or more sensors;
    predicting a future position of the input object based on both the position data and the further data; and
    updating the display based on the predicted future position.

From another aspect, the invention provides apparatus comprising:
    an interactive display;
    a position sensor for generating position data representing a series of positions, over time, of an input object relative to the interactive display; and
    a processing system configured to:
        predict a future position of the input object based on both the position data and further data; and
        update the display based on the predicted future position.

In some embodiments of any aspect of the invention, the further data may relate to or represent a position, motion, momentum, or state of the input object. The further data may comprise data representing an acceleration and/or rotation and/or orientation of the input object. Such data may be generated from one or more sensors, which may be separate from the position sensor used to generate the position data. The sensors may, for example, form part of the input object and/or the interactive display, and may comprise one or more of: an accelerometer, a gyroscope, a compass, a pressure sensor, an electromagnetic coil, an antenna, an RF transmitter, an RF receiver, and a light sensor.

In some embodiments, the further data may relate indirectly to a state of the input object. The further data may comprise data representing a position, motion, momentum, or state of an object other than the input object. This other object may nevertheless be connected to the input object in some way, such as by a physical connection. If the input object is a stylus, pen or a user's finger, the other object may be part or all of the user's hand, such as the palm or heel. In some embodiments, the same position sensor may be used to generate the further data, which may represent a series of positions, over time, of an object other than the input object. For example, a resistive or capacitive touch-screen sensor array may be used to generate position data representing the position of a user's finger-tip (or of a stylus or pen held by the user) over time, and/or to generate further data representing the position of the palm or heel of a hand of the user over time. Such hand position data may provide useful additional information about the likely future motion of the input object, and therefore improve the accuracy of the prediction engine.

The predicted position of the input object typically refers to the position of a part of the input object that interfaces with the interactive display—e.g., the centre of a user's fingertip, or the tip or coil of an electromagnetic stylus. It will be appreciated that the precise part of the input object whose position is predicted may change over time—e.g., if a user rolls his or her finger to the left or right during an input stroke, the contact point will change.

A velocity and acceleration of the input object may be estimated repeatedly, at intervals (which may be regular or irregular intervals)—i.e., in a regular or irregular update cycle. The display may be updated at each interval or over a subset of the intervals—i.e., in a regular or irregular cycle. Alternatively, the display may be updated at different intervals, not necessarily synchronised with the velocity and acceleration estimates. As with the position data, the velocity and acceleration preferably relate to the movement of the input object at a point where it interfaces with the interactive display. However, in some embodiments, a velocity and/or an acceleration of another part of the input object (e.g., the opposite end of a stylus from its tip) may be used to predict the future position of the input object. In particular, if the input object comprises an accelerometer, the acceleration of the input object may be measured for the location of the accelerometer within the input object.

In one set of embodiments, the further data comprises pressure data, which may be generated from a pressure sensor of the input object and/or from a pressure sensor of the display. This pressure data may be used to scale the aggressiveness of the future position predictions, for example to reduce the number of future predicted positions if pressure is reducing. Thus, the processing system may be configured to generate, in successive update cycles, successive sequences of future position estimates over time, and may be configured to generate a first sequence of a first duration when the pressure data represents a first pressure, and to generate a second sequence of a second duration, shorter than the first duration, when the pressure data represents a second pressure that is lighter than the first pressure. The duration of each sequence may increase monotonically with pressure. The duration may be determined from one pressure value, or it may depend on a series of pressure values over time—e.g., the duration may be reduced when the first derivative of pressure is below a predetermined negative threshold level. These uses of pressure data can be useful because the applicant has realised that a user typically reduces his or her pressure on an input object towards the end of a stroke, and therefore reducing the number of future predicted positions when pressure is lighter makes the drawn line less likely to overshoot.

In some embodiments, a second derivative of velocity of the input object is also be estimated. This value is known as jerk. Jerk may additionally be used to predict the future position of the input object.

In some update cycles, a plurality of future positions may be predicted based on the estimated velocity and estimated acceleration. The number of future positions, in a set of future positions, that are predicted in each update cycle may be fixed, but is preferably variable. The processing system may calculate how many future positions to predict based on the position data—e.g., based on the velocity and/or acceleration and/or jerk of the input object. For example, when the input object is moving fast, a larger number of future positions may be predicted, while a small number may be predicted when the input object is moving slower.

A confidence measure for the predicted future position or positions may be calculated (e.g., output by the prediction process, as described above). This confidence measure preferably represents a probability that the input object will indeed move as predicted.

The calculating of the confidence measure may depend on training data, acquired through an analysis of historic input data.

The predicted future position or positions of the input object may be smoothed before the display is updated. The smoothing is preferably applied to a combination of the position data (before or after de-noising) and the predicted future position or positions. Any appropriate smoothing operation may be used—e.g., a recursive Bayesian filter, such as a Kalman filter.

When a set of one or more future positions is determined in one update cycle, then, before the display is updated, a validation process is applied to the predicted future positions (optionally after smoothing). The validation process may use one or more of velocity, acceleration, jerk, and a confidence measure (which does not necessarily take account of velocity or acceleration), to assess the set of future positions against one or more validation criteria. If the validation process fails, then the processing system may predict a smaller number of future positions. This may be done by repeating one or more of the regression and smoothing steps, for a smaller number of future positions. A shorter prediction would typically produce a more certain prediction, and therefore be more likely to pass the validation process.

A confidence measure may be used to update the display in other ways also. For instance, some embodiments may control the number of future positions that are predicted in each update cycle in order to give a prediction confidence that meets a quality criterion, such as being at least a minimum threshold confidence (e.g., 90%), or as close as possible to a target confidence (e.g., 90%).

The idea of using a confidence measure to control an interactive display is believed to be novel and inventive in its own right.

Thus, from a further aspect, the invention provides a method of controlling an interactive display, the method comprising:
  receiving position data representing a series of positions, over time, of an input object relative to the interactive display;
  predicting a set of one or more future positions of the input object based on the position data;
  evaluating a confidence measure for the set of predicted positions, representing a probability that the input object will move to the predicted positions; and
  updating the display based on the predicted future positions and the confidence measure.

From another aspect, the invention provides apparatus comprising:
  an interactive display;
  a position sensor for generating position data representing a series of positions, over time, of an input object relative to the interactive display; and
  a processing system configured to:
    predict a set of one or more future positions of the input object based on the position data;
    evaluation a confidence measure for the set of predicted positions, representing a probability that the input object will move to the predicted positions; and
    update the display based on the predicted future positions and the confidence measure.

In some embodiments of this, or any other aspect, a plurality of position predictions may be calculated and a respective value of the confidence measure may be determined for each candidate future position. The confidence measure may be calculated explicitly (e.g., stored in an array in a memory of the apparatus), or it may be determined by a function, which may only be evaluated as required. The position predictions may all relate to a common point in time, or they may relate to a series of points in time. The confidence measure may be used to determine which of a set of position predictions are used to update the display. How far the updating of the display reaches into the future may depend on one or more values of the confidence measure—e.g., with the predictive updating being shorter when confidence is low, and longer when confidence is high.

In some embodiments, the confidence measure may be used to select one future position from a plurality of future positions relating to a common point in time. The selected future position may then be used to update the display. For example, the future position having a highest value of the confidence measure may be selected.

In other embodiments, a spatial averaging operation may be applied to a plurality of predicted future positions relating to a common point in time. The confidence measure may also be used as input to the spatial averaging operation. The spatial averaging operation may output a single future position that represents an average of the plurality of future positions—for example, it may output a position representing the geometric median of the input positions. The averaging operation may be weighted according to the respective confidence measures—for example, it may solve the Weber problem or the attraction—repulsion problem for the set of input positions. A single predicted future position may be output, which may then be used to update the display.

How the display is updated will depend on the application.

In some embodiments, the apparatus can be used as a drawing or writing tablet—e.g., an e-ink device. The display may show one or more line segments representing the actual and/or predicted positions of the input object over time. Each line segment is preferably continuous (within the limits of any pixilation of the display). The display may be updated based on a predicted future position by extending a line segment with an extension segment. Any one or more of the shape, length, position, thickness and colour of the extension segment may be determined by the predicted future position.

In other embodiments, the display may show an image, such as an icon or map or window, which is moved based on the series of positions. In this case, the updating may comprise moving (i.e., redrawing in a different position) a display element based on the predicted future position.

The future position or positions may be explicitly calculated—e.g., as (x,y) coordinates, whose values are stored in a memory of the apparatus. However, they may be determined implicitly within another calculation. Similarly, the velocity and/or acceleration may be explicitly calculated, or they may be determined implicitly as part of a calculation performed by the apparatus.

In some embodiments, the display may be corrected as additional position data is obtained—e.g., by deleting any updating that is based on an incorrect prediction, and updating the screen using the actual position data—but in other embodiments the updating based on predicted positions is retained.

The apparatus may be any electronic device, such as a mobile telephone, a tablet computer, a domestic appliance, etc.

The display may comprise an LCD, oLED, plasma or electrophoretic panel, or may use any other appropriate display technology. The position sensor may comprise a resistive film sensor, or a capacitive input sensor, a surface acoustic wave input sensor, an electromagnetic digitiser, or any other appropriate touch (including proximity) or position-detection technology. The position sensor preferably comprises electronic circuitry for acquiring the position data—e.g., one or more amplifiers, analogue-to-digital converters, etc.

The processing system may comprise any one or more of the following: processors, DSPs, ASICs, volatile memory, non-volatile memory, inputs, outputs, etc., as will be appreciated by one skilled in the art. Some or all of the operations described herein may be carried out by, or under the control of, software stored in a memory and executing on one or more processors in the processing system. The apparatus may be a single unit or it may be distributed—e.g. with one or more operations being performed remotely, such as on a remote server. The operations need not necessarily be performed in the order described or claimed herein, unless the context requires this.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION OF THE PREFERRED EMBODIMENTS

Figure 1:
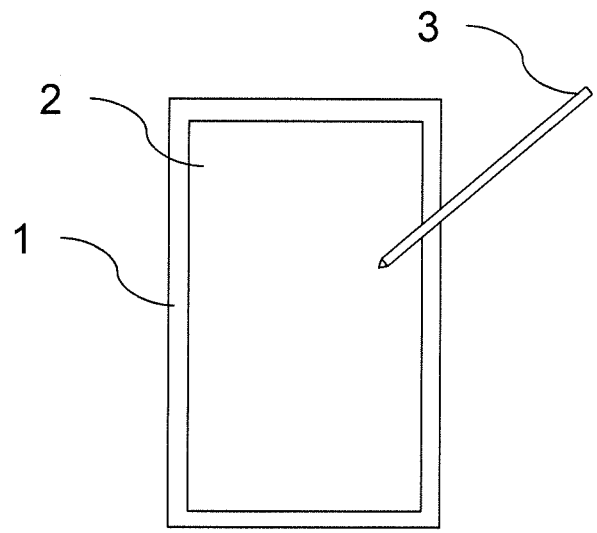
FIG. 1 is a plan view of a tablet embodying the invention, with a stylus.

FIG. 1 shows a portable sketchbook, or e-ink tablet 1, which has an electrophoretic display screen 2. A stylus 3 can be used to draw or write on the tablet 1.

Figure 2:
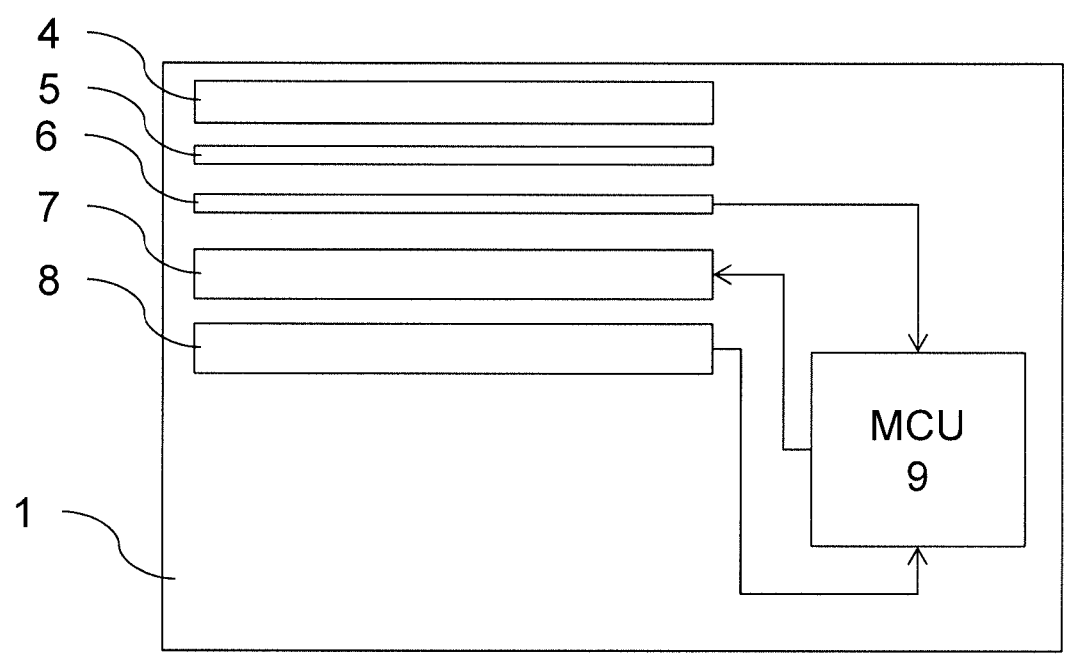
FIG. 2 is a schematic, exploded vertical cross-section through the tablet.

FIG. 2 shows the main components of the display screen 2, which include a protective acrylic outer layer 4, below which is an optically-clear adhesive layer 5, joining the outer layer 4 to a capacitive touch film 6. Below the capacitive touch film 6 is the electrophoretic display layer 7, and underneath that is an electromagnetic digitiser 8.

The capacitive touch film 6 outputs position information to a microcontroller unit (MCU) 9. This information will typically relate to the position of a user's finger or hand (or both).

The electromagnetic digitiser 8 is arranged to output an (x,y)-position coordinate and a pressure measurement for the stylus 3, to the MCU 9, approximately every 6 ms. The electromagnetic digitiser 8 communicates with the stylus 3 using known electromagnetic resonance technology to determine the position of the stylus 3. The stylus 3 sends pressure or force readings to the tablet 1 at intervals, indicating on how firmly the stylus 3 tip is being pressed onto the table 1.

The MCU 9 can control the state (output) of the electrophoretic display screen 2 by sending appropriate control signals to the screen 2. In this example, the screen update rate is 80 Hz (i.e., once every 12.5 ms).

The display screen 2, on which the user draws with the stylus 3 has, in this particular example, an inherent update latency of approximately 70 ms for responding to drawing inputs from the stylus 3. However, it is desirable that the perceived latency be reduced by at least another 15 ms, so that the latency is not noticeable to most users.

This is accomplished, in some embodiments, by predicting the position of the stylus 3 forward in time by three samples of the electromagnetic digitiser 8 (approximately 18 ms), from the current set of measured position samples.

In other embodiments, instead of always predicting exactly three samples ahead, the MCU 9 aims to minimise the number of pixels in the "white tail", which is the space between the tip of the stylus 3 and the end of the drawn line output by the display screen 2 at any instant. It is this "white tail" which is what the user actually observes. When the stylus 3 tip moves fast, the stylus 3 is more pixels ahead of the drawn curve compared with when the stylus 3 moves slowly. Hence, the speed can be a factor that determines how aggressive the prediction should be.

Figure 3:
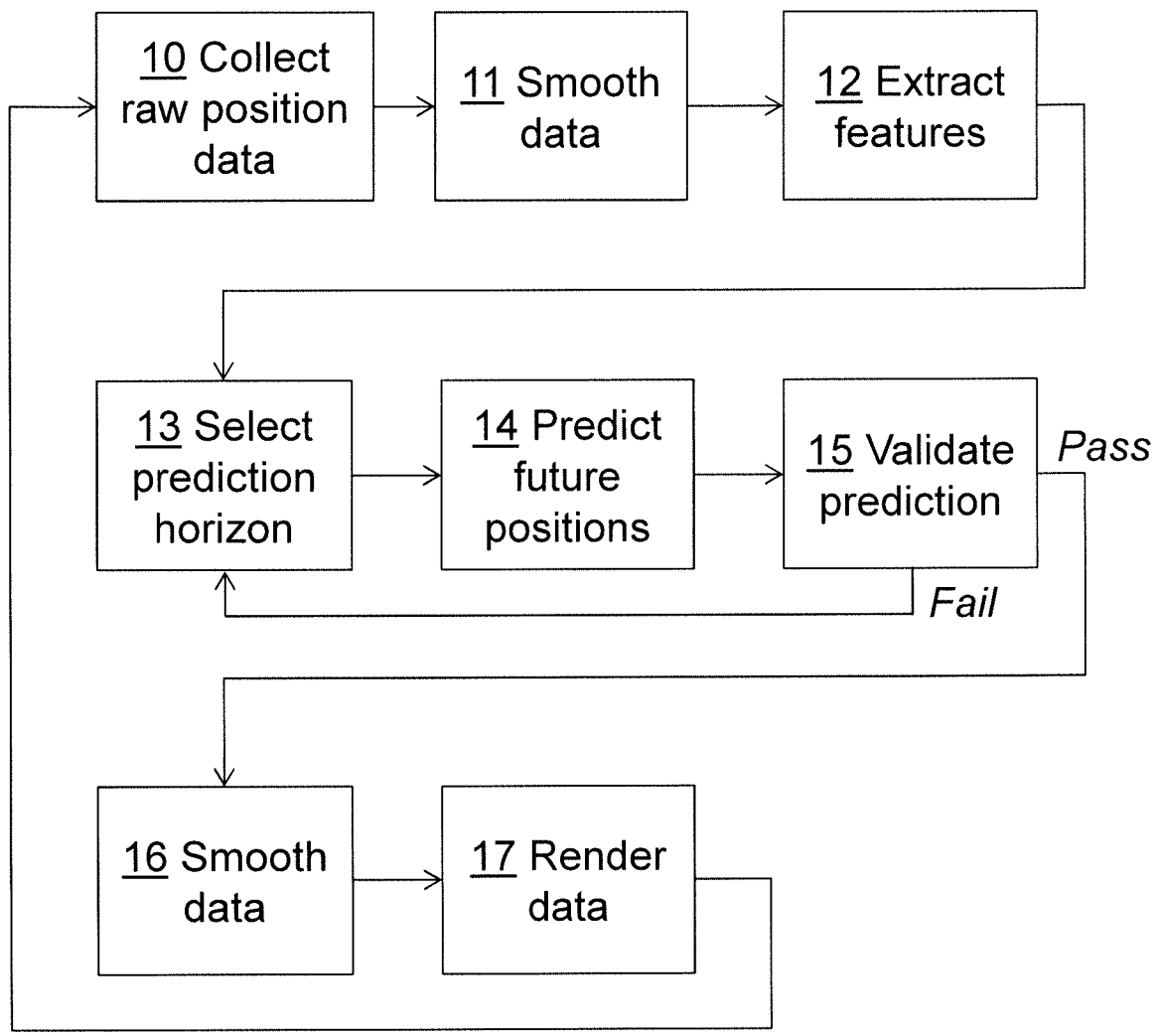
FIG. 3 is a flow chart of steps implemented by the tablet.

FIG. 3 shows the main steps carried out by the MCU 9 in each update cycle. Here, the update cycle rate corresponds to the electromagnetic digitiser 8 rate (approximately 166 Hz), with the display updates occurring independently of this. However, other embodiments, may, of course, use different update rates.

First, any new raw position data (consisting of a pair of position coordinates, a pressure value, and a pen-angle value) is collected 10 from the electromagnetic digitiser 8 and added to a buffer of previously-collected position data.

The position data in the buffer is then smoothed 11. The smoothing may be applied over all the position data in a current input stroke. Where an input stroke starts and ends is determined by analysing the pressure data from the electromagnetic digitiser 8: pressure going from below or equal to zero to above zero indicates the beginning of a new line, while going from above zero to below or equal to zero indicates the end of the line. Distance and/or time measurements may additionally, or alternatively, be used to help identify individual strokes.

The smoothing on an input stroke is carried out using a Kalman smoother or filter in some embodiments, or using spline smoothing in other embodiments. Other appropriate smoothing techniques may be used instead. This smoothing removes noise from the raw data.

Appropriate features are then extracted 12 from the smoothed data. These may include a sequence of one or more position coordinates, a sequence of one or more first derivatives of position with respect to time in one or two dimensions, a sequence of one or more second derivatives of position with respect to time in one or two dimensions, a sequence of one or more third derivatives of position with respect to time, and/or a sequence of angles.

The extracted features are input to a prediction-horizon step 13, which determines how far ahead to predict motion of the input object. This decision may be based on values such as the first, second and third time-derivatives of position along the x-axis and/or the y-axis, up until the prediction point. It may also take account of a validation result from a subsequent processing step, as explained below. If, for instance, the stylus 3 is moving relatively fast, or is accelerating fast, a smaller number of time steps may be predicted, to try to improve the quality of the prediction.

Control then passes to a prediction step 14, which predicts a sequence of future coordinates, based on the smoothed data. The prediction may also use other sources of information, such as pressure data from the stylus 3, and/or data from one or more accelerometers and/or gyroscopes on the stylus 3 and/or data from the capacitive touch film 6 (e.g., relating to the position of a user's hand, which may be resting on the tablet 1 while writing or drawing with the stylus 3). For example, in some embodiments a smaller number of time steps is predicted if the pressure data indicates a reduction in pressure.

The length of the sequence depends on the number of time steps determined in the previous step 13. The prediction is based on the smoothed position data, and uses Gaussian Process Regression (GPR). Alternatively or additionally, other prediction mechanisms can be used, such as support vector regression, multilayer perceptrons, random forest, recurrent neural nets, etc.

In some embodiments, the position of a user's hand can be estimated, based on pressure on the display (from the capacitive touch film 6) and the angle of the stylus 3 relative to the tablet 1. During a training phase, these hand position estimates may be used to learn what kind of movement the hand is physically able to do. During normal use, the hand position estimates are used to provide better estimates of jerk (changes in acceleration), based on prior or learnt knowledge of how a human hand works.

The predicted positions are then validated 15. This is done by checking whether values such as velocity—($x'$, $y'$), acceleration—($x''$, $y''$), jerk in the x-axis—$x'''$, jerk in the y-axis—$y'''$, angle of trajectory, at one or more points in the prediction positions are within predetermined bounds. If the prediction step 14 outputs a confidence measure, this may also be used in the validation process 15. If the prediction positions are validated, control passes to a post-prediction smoothing step 16. If they are not, control returns to the prediction-horizon step 13, with an instruction to generate a shorter prediction horizon. The prediction step 14 is then run again, on the shorter horizon, and further validation 15 is carried out, in a cycle until a valid prediction is obtained.

The post-prediction smoothing step 16 smoothes the predicted values combined with the raw data (before or after the first smoothing step 11), using a Kalman filter or smoother, a spline, or any other appropriate method.

The MCU 9 then uses the post-prediction smoothed data to update the electrophoretic display screen 2. The smoothed data may need to be processed to fit the screen resolution—e.g., using a nearest neighbour algorithm—and to apply other desired operations such as anti-aliasing, before being rendered.

In some embodiments, the MCU 9 tries to predict 20 ms into the future, and then, if validation fails, tries to predict 10 ms into the future if confidence from the GPR is 50-75% or 5 ms into the future if confidence from the GPR is 0-50%. In this case, the GPR may implicitly be using features such as change in velocity when determining the confidence.

Alternatively, in another set of embodiments, the MCU 9 uses GPR to provide the longest prediction horizon that satisfies a predetermined confidence level, such as 90%. In this case, a single prediction operation effectively conflates the prediction step 14 of FIG. 3 with the prediction-horizon step 13. If the validation 15 fails, the confidence level may be lowered (e.g., to 75%), and the GPR prediction operation 13, 14 carried out again, this time aiming to use the longest prediction horizon that satisfies a confidence level of 75%. Fails in subsequent validations will lead to progressively lower confidence levels being used.

The order of the steps of FIG. 3 may be changed in some embodiments. Other steps may be included. One or more steps may be omitted.

Figure 4:
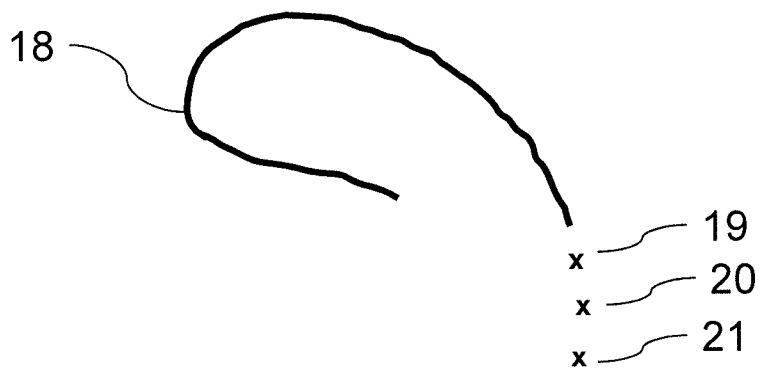
FIG. 4 is a diagram of a line drawn by the stylus and a set of future predicted positions.

FIG. 4 shows an example path 18 along which the user has moved the tip of the stylus 3 up until a point in time. The electromagnetic digitiser 8 has sampled this path at intervals, and so the MCU 9 has access to a sampled version of this path 18, stored in memory.

Depending on how accurately the MCU 9 has been able to predict this path 18 up until this point in time, the line displayed on the tablet 1 may represent this path 18 more or less accurately.

At this point in time, the MCU 9 then uses the collected position data, and any other relevant sensor data, such as pressure data from the stylus 3, and possibly accelerometer data from the stylus 3, to predict a sequence of future position coordinates 19, 20, 21, using the steps described above. The MCU 9 then instructs the electrophoretic display screen 2 to render a line through these points. Because of the delay in updating the electrophoretic display screen 2, the stylus 3 will have moved on before the coordinates 19, 20, 21 are rendered. If the prediction is accurate, the stylus 3 will pass along these coordinates 19, 20, 21. If the user moves the stylus 3 not as predicted, the rendered line will be inaccurate.

However, because of the steps above, this typically won't be inaccurate in a way that is distracting to the user.

The invention claimed is:

1. A method of controlling an interactive display, the method comprising:
   receiving position data representing a series of positions, over time, of an input object relative to the interactive display;
   predicting a plurality of positions of the input object based on the position data, wherein the predicted positions all relate to a future common point in time;
   evaluating a confidence measure for each of the plurality of predicted positions to determine a respective plurality of confidence values, each representing a probability that the input object will move to the respective predicted position;
   applying a validation process to the plurality of predicted positions, wherein the validation process uses the plurality of confidence values to assess the predicted positions against one or more validation criteria, and, if the predicted positions do not meet the validation criteria, predicting a second plurality of positions for a second future common point in time, wherein the second future common point in time is sooner than the future common point in time for the plurality of predicted positions which did not meet the validation criteria;
   using the confidence values to identify a predicted position to use to update the display; and
   updating the display based on the identified predicted position.

2. The method of claim 1, wherein the predicted position to use to update the display is identified by selecting one of the plurality of predicted positions using the respective confidence values.

3. The method of claim 1, further comprising controlling the number of positions that are contained in the plurality of predicted positions in order that the predicted position to use to update the display meets a quality criterion.

4. The method of claim 1, further comprising displaying one or more line segments representing received and predicted positions of the input object over time.

5. The method of claim 1, wherein the interactive display comprises an electrophoretic display.

6. The method of claim 1, further comprising a position sensor, wherein the position sensor comprises at least one of: a resistive film sensor, a capacitative input sensor, a surface acoustic wave input sensor, an electromagnetic digitiser.

7. The method of claim 1, further comprising applying a smoothing operation to a combination of (i) the received position data and (ii) the predicted position to use to update the display, to generate smoothed data, and using the smoothed data to update the display.

8. An apparatus comprising:
   an interactive display;
   a position sensor for generating position data representing a series of positions, over time, of an input object relative to the interactive display; and
   a processing system configured to:
      predict a plurality of positions of the input object based on the position data, wherein the predicted positions all relate to a future common point in time;
      evaluate a respective confidence measure for each of the plurality of predicted positions to determine a respective plurality of confidence values, each representing a probability that the input object will move to the respective predicted position;
      apply a validation process to the plurality of predicted positions, wherein the validation process uses the plurality of confidence values to assess the predicted positions against one or more validation criteria and wherein, if the predicted positions do not meet the validation criteria, the processing system is configured to predict a second plurality of positions for a second future common point in time, wherein the second future common point in time is sooner than the future common point in time for the plurality of predicted positions which did not meet the validation criteria;
      identify, using the confidence values, a predicted position to use to update the display; and
      update the display based on the identified predicted position.

9. The apparatus of claim 8, wherein the processing system is configured to identify the predicted position to use to update the display by selecting one of the plurality of predicted positions using the respective confidence values.

10. The apparatus of claim 8, wherein the processing system is configured to control the number of positions that are contained in the plurality of predicted positions in order that the predicted position to use to update the display meets a quality criterion.

11. The apparatus of claim 8, configured to display one or more line segments representing received and predicted positions of the input object over time.

12. The apparatus of claim 8, wherein the interactive display comprises an electrophoretic display.

13. The apparatus of claim 8, wherein the position sensor comprises at least one of: a resistive film sensor, a capacitative input sensor, a surface acoustic wave input sensor, an electromagnetic digitiser.

14. The apparatus of claim 8, wherein the processing system is configured to apply a smoothing operation to a combination of (i) the received position data and (ii) the predicted position to use to update the display, to generate smoothed data, and to use the smoothed data to update the display.

15. A method of controlling an interactive display, the method comprising:
   receiving position data representing a series of positions, over time, of an input object relative to the interactive display;
   predicting a plurality of positions of the input object based on the position data, wherein the predicted positions all relate to a future common point in time;
   evaluating a confidence measure for each of the plurality of predicted positions to determine a respective plurality of confidence values, each representing a probability that the input object will move to the respective predicted position;
   inputting the predicted positions and the respective confidence values to a spatial averaging operation which outputs a predicted position to use to update the display, wherein the predicted position represents an average of the plurality of predicted positions weighted according to the respective plurality of confidence values; and
   updating the display based on the output predicted position.

16. An apparatus comprising:
   an interactive display;
   a position sensor for generating position data representing a series of positions, over time, of an input object relative to the interactive display; and
   a processing system configured to:

predict a plurality of positions of the input object based on the position data, wherein the predicted positions all relate to a future common point in time;

evaluate a respective confidence measure for each of the plurality of predicted positions to determine a respective plurality of confidence values, each representing a probability that the input object will move to the respective predicted position;

input the predicted positions and the respective confidence values to a spatial averaging operation which outputs a predicted position to use to update the display, wherein the predicted position represents an average of the predicted positions weighted according to the respective plurality of confidence values; and update the display based on the output predicted position.

17. The apparatus of claim 16, wherein the processing system is configured to control the number of positions that are contained in the plurality of predicted positions in order that the predicted position to use to update the display meets a quality criterion.

18. The apparatus of claim 16, configured to display one or more line segments representing received and predicted positions of the input object over time.

19. The apparatus of claim 16, wherein the interactive display panel comprises an electrophoretic display.

20. The apparatus of claim 16, wherein the position sensor comprises at least one of: a resistive film sensor, a capacitative input sensor, a surface acoustic wave input sensor, an electromagnetic digitiser.

21. The apparatus of claim 16, wherein the processing system is configured to apply a smoothing operation to a combination of (i) the received position data and (ii) the predicted position to use to update the display, to generate smoothed data, and to use the smoothed data to update the display.

* * * * *